United States Patent
Norimoto et al.

(10) Patent No.: US 12,071,025 B2
(45) Date of Patent: Aug. 27, 2024

(54) ELECTRIFIED VEHICLE

(71) Applicant: TOYOTA JIDOSHA KABUSHIKI KAISHA, Toyota (JP)

(72) Inventors: Kazuki Norimoto, Toyota (JP); Shingo Nagai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/539,525

(22) Filed: Dec. 14, 2023

(65) Prior Publication Data

US 2024/0246424 A1 Jul. 25, 2024

(30) Foreign Application Priority Data

Jan. 25, 2023 (JP) ................. 2023-009174

(51) Int. Cl.
*B60L 15/20* (2006.01)
*B60L 15/06* (2006.01)

(52) U.S. Cl.
CPC ............ *B60L 15/20* (2013.01); *B60L 15/06* (2013.01); *B60L 2240/423* (2013.01); *B60L 2240/425* (2013.01)

(58) Field of Classification Search
CPC .... B60L 15/06; B60L 15/20; B60L 2240/423; B60L 2240/425; B60W 10/08; B60W 2510/087; B60W 2710/088
See application file for complete search history.

(56) References Cited

U.S. PATENT DOCUMENTS

| | | | |
|---|---|---|---|
| 2002/0006154 A1* | 1/2002 | Nada | .............. G01K 7/42 374/E7.042 |
| 2010/0140002 A1 | 6/2010 | Miura et al. | |
| 2017/0240163 A1* | 8/2017 | Suenaga | .............. B60W 10/08 |

FOREIGN PATENT DOCUMENTS

| | | |
|---|---|---|
| JP | 2008-206340 A | 9/2008 |
| JP | 2010-268644 A | 11/2010 |

\* cited by examiner

*Primary Examiner* — Edwin A Young
(74) *Attorney, Agent, or Firm* — SoraIP, Inc.

(57) ABSTRACT

The electrified vehicle includes a first motor that drives a first wheel, a second motor that drives a second wheel different from the first wheel, a temperature sensor provided for the first motor, and a control device. The control device estimates the temperature of the first motor based on the detection signal from the temperature sensor, and corrects the temperature of the first motor based on information indicating a relative relation between operation of the first motor and operation of the second motor. These processes allow the control device to estimate the temperature of the second motor, control the operation of the first motor based on the estimated temperature of the first motor, and control the operation of the second motor based on the estimated temperature of the second motor.

4 Claims, 3 Drawing Sheets

ELECTRIFIED VEHICLE

CROSS-REFERENCE TO RELATED APPLICATION

This application claims priority to Japanese Patent Application No. 2023-009174 filed on Jan. 25, 2023, incorporated herein by reference in its entirety.

BACKGROUND OF THE INVENTION

1. Field of the Invention

Technology disclosed in the present specification relates to an electrified vehicle.

2. Description of Related Art

Japanese Unexamined Patent Application Publication No. 2010-268644 (JP 2010-268644 A) discloses an electrified vehicle that includes a first motor, a second motor, a first temperature sensor, a second temperature sensor, and a control device. The first motor drives a first wheel. The second motor drives a second wheel. The first temperature sensor is provided for the first motor. The second temperature sensor is provided for the second motor. The control device estimates temperature of the first motor based on a detection signal from the first temperature sensor. The control device estimates temperature of the second motor based on a detection signal from the second temperature sensor. The control device controls operation of the first motor based on a first motor temperature. The control device controls operation of the second motor based on a second motor temperature.

SUMMARY OF THE INVENTION

The electrified vehicle in JP 2010-268644 A requires motor sensors for estimating respective motor temperatures, in order to control the operations of the first motor and the second motor. In electrified vehicles, there is demand to reduce the number of parts making up the electrified vehicle.

The present specification provides a technology that enables reduction in the number of parts making up an electrified vehicle.

In a first aspect of the present technology, an electrified vehicle may include
 a first motor that drives a first wheel,
 a second motor that drives a second wheel that is different from the first wheel,
 a temperature sensor provided for the first motor, and
 a control device.
The control device may
 estimate a temperature of the first motor based on a detection signal from the temperature sensor,
 estimate a temperature of the second motor by correcting the temperature of the first motor based on information indicating a relative relation between operation of the first motor and operation of the second motor,
 control the operation of the first motor based on the temperature of the first motor that is estimated, and
 control the operation of the second motor based on the temperature of the second motor that is estimated.

According to the above configuration, the control device can control the operation of the first motor based on a first motor temperature, which is estimated based on the detection signal from the temperature sensor. Further, the control device can control the operation of the second motor based on a second motor temperature, which is estimated using the temperature of the first motor. Accordingly, the electrified vehicle does not need to have a temperature sensor provided for the second motor for estimating the second motor temperature. Thus, the number of parts making up the electrified vehicle can be reduced.

According to a second aspect, in the first aspect, the information indicating the relative relation may be information indicating a proportion of requested driving force of the second motor as to requested driving force of the first motor.

There is a correlative relation between the requested driving force and the motor temperature. Accordingly, correcting the temperature of the first motor based on the information indicating the proportion of the requested driving force of the second motor as to the requested driving force of the first motor enables the second motor temperature to be appropriately estimated.

According to a third aspect, in the first aspect or the second aspect, the information indicating the relative relation may be information indicating a proportion of revolutions of the second motor as to revolutions of the first motor.

There is a correlative relation between the revolutions of the motor and the motor temperature. Accordingly, correcting the temperature of the first motor based on the information indicating the proportion of the revolutions of the second motor as to the revolutions of the first motor enables the second motor temperature to be appropriately estimated.

According to a fourth aspect, in any one of the first aspect to the third aspect, the information indicating the relative relation may be information indicating a proportion of a motor load of the second motor as to a motor load of the first motor.

There is a correlative relation between the motor load and the motor temperature. Accordingly, correcting the temperature of the first motor based on the information indicating the proportion of the motor load of the second motor as to the motor load of the first motor enables the second motor temperature to be appropriately estimated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Configuration of Electrified Vehicle 2

Figure 1:
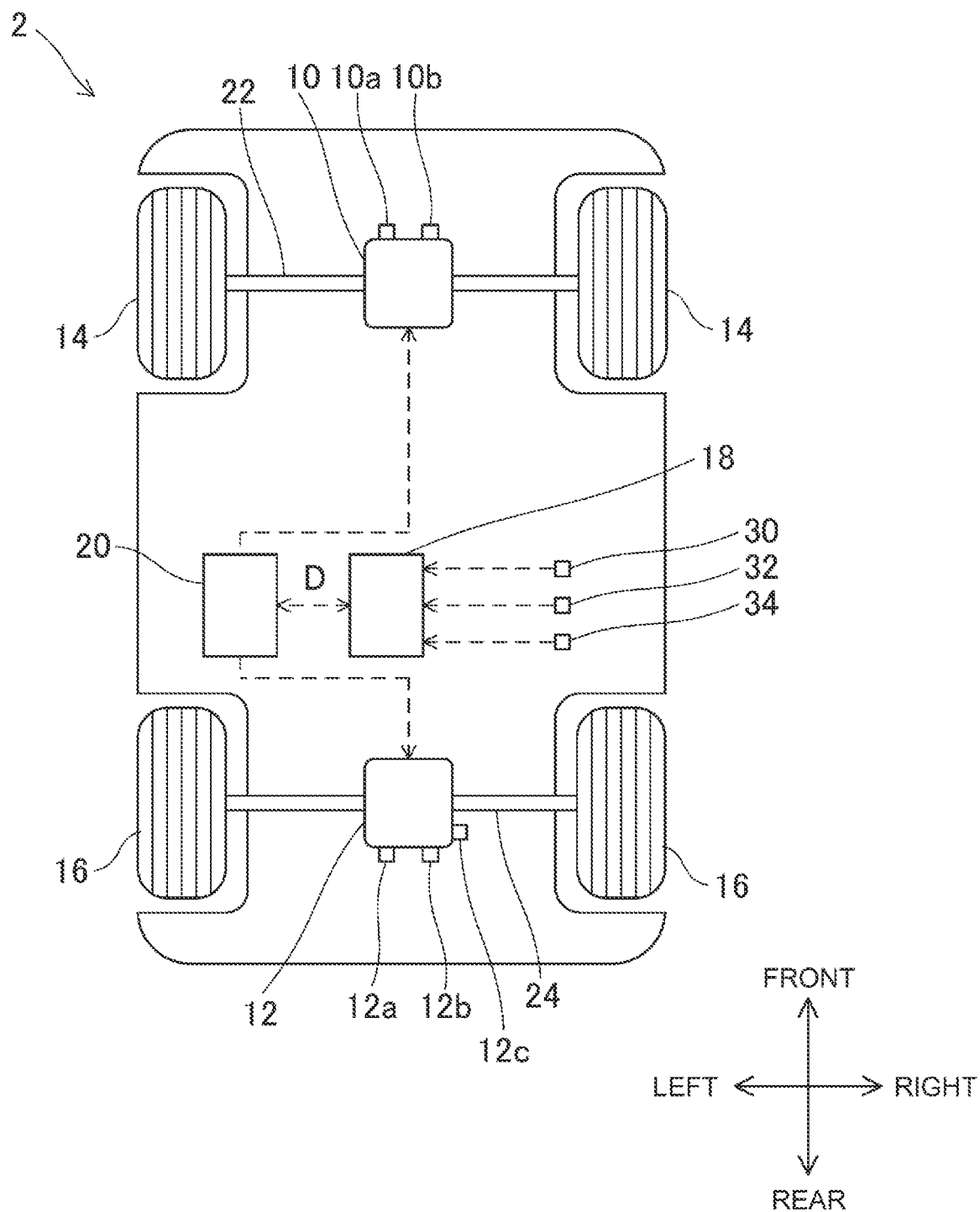
FIG. 1 is a schematic diagram of an electrified vehicle.

As shown in FIG. 1, the electrified vehicle 2 includes a front motor 10, a rear motor 12, front wheels 14, rear wheels 16, a main Electronic Control Unit (main ECU) 18 and a motor ECU 20. Electrified vehicle 2 is an electric four-wheel drive vehicle. The electrified vehicle in this specification broadly means a vehicle having a motor for driving wheels. For example, electrified vehicles include battery electrified vehicles, fuel cell electric vehicles, plug-in hybrid electric vehicles, etc., in addition to hybrid electric vehicles.

The front motor 10 is connected to the front wheels 14 via a front wheel drive shaft 22. The front motor 10 drives front wheels 14 via a front wheel drive shaft 22. The front motor 10 includes a revolutions sensor 10a that detects the revolutions of the front motor 10 (hereinafter referred to as "front motor revolutions"), and a motor rotation angle of the rotor (not shown) of the front motor 10. A resolver 10b is provided.

Rear motor 12 is connected to rear wheels 16 via a rear wheel drive shaft 24. Rear motor 12 drives rear wheels 16 via rear wheel drive shaft 24. The rear motor 12 is provided with a revolutions sensor 12a, a resolver 12b, and a temperature sensor 12c. The revolutions sensor 12a detects the revolutions of the rear motor 12 (hereinafter referred to as "rear motor revolutions"). The resolver 12b detects the rotation angle of the rotor (not shown) of the rear motor 12. A temperature sensor 12c is provided for the rear motor 12. In this embodiment, the temperature sensor 12c detects the coil temperature TR1 of the coil (not shown) of the rear motor 12. Note that the front motor 10 is not provided with a temperature sensor for the front motor 10.

The main ECU 18 is configured using a computer having a CPU, ROM, and RAM. The main ECU 18 is electrically connected to an outside air temperature sensor 30, a slope sensor 32, a vehicle speed sensor 34, and the like. An outside air temperature sensor 30 detects outside air temperature. A slope sensor 32 detects the slope of the road surface on which the electrified vehicle 2 is located. A vehicle speed sensor 34 detects the vehicle speed of the electrified vehicle 2. The main ECU 18 determines the requested driving force, for example, according to the user's accelerator operation. Then, the main ECU 18 distributes the requested driving force to the front wheel requested driving force and the rear wheel requested driving force based on the outside air temperature, gradient, vehicle speed and the like. The main ECU 18 then supplies the motor ECU 20 with driving force distribution information D indicating the proportion of the requested front wheel driving force to the requested rear wheel driving force.

The motor ECU 20 is configured using a computer having a CPU, ROM, and RAM. The motor ECU 20 is electrically connected to the revolutions sensors 10a, 12a, resolvers 10b, 12b, and the temperature sensor 10c. The motor ECU 20 is configured to communicate with the main ECU 18. The motor ECU 20 uses the driving force distribution information D supplied from the main ECU 18 to calculate the front wheel requested torque and the rear wheel requested torque. Then, the motor ECU 20 controls the output current of a front inverter (not shown) connected to the front motor 10 so that the output torque of the front motor 10 becomes the front wheel requested torque. The motor ECU 20 controls the output current of the front inverter so that the output torque of the front motor 10 does not exceed a front torque limit value, which will be described later. The motor ECU 20 also controls the output current of a rear inverter (not shown) connected to the rear motor 12 so that the output torque of the rear motor 12 becomes the rear wheel requested torque. The motor ECU 20 controls the output current of the rear inverter so that the output torque of the rear motor 12 does not exceed a rear torque limit value, which will be described later.

Figure 2:
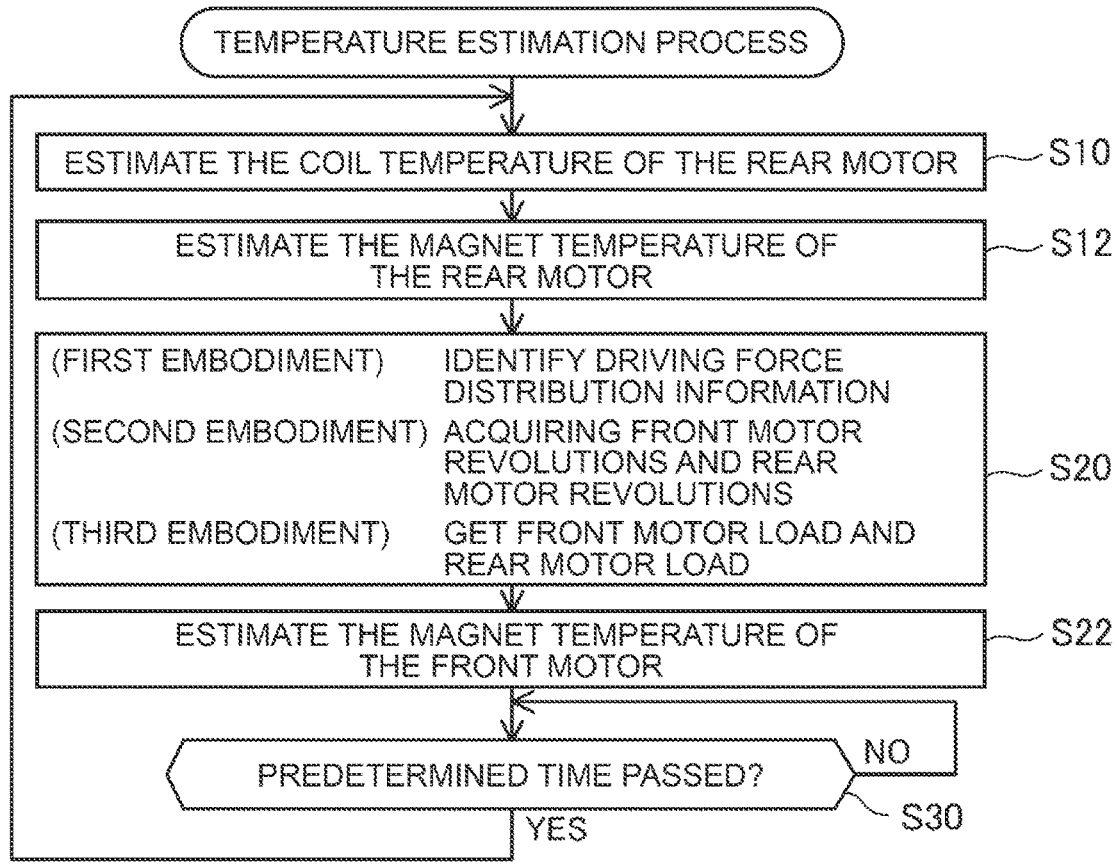
FIG. 2 is a flowchart of temperature estimation processing.

Temperature Estimation Process; FIG. 2

A temperature estimation process executed by the motor ECU 20 will be described with reference to FIG. 2. The temperature estimation process estimates a magnet temperature TF2 of the front motor 10 used in the front motor process (see FIG. 3) and a magnet temperature TR2 of the rear motor 12 used in the rear motor process (see FIG. 4).

At S10, the motor ECU 20 estimates the coil temperature TR1 of the rear motor 12 using the detection signal from the temperature sensor 12c.

At S12, the motor ECU 20 estimates the magnet temperature TR2 of the rear motor 12 using the coil temperature TR1 of the rear motor 12 estimated at S10. The motor ECU 20 calculates the magnet temperature TR2 using a temperature model or the like that indicates the correlation between the coil temperature TR1 and the magnet temperature TR2. That is, the motor ECU 20 uses the detection signal from the temperature sensor 12c to estimate the magnet temperature TR2.

In S20, the motor ECU 20 identifies the driving force distribution information D. The driving force distribution information D is information indicating the proportion of the front wheel requested driving force to the rear wheel requested driving force. As described above, the driving force distribution information D is supplied from the main ECU 18 to the motor ECU 20.

At S22, the motor ECU 20 estimates the magnet temperature TF2 of the front motor 10 by correcting the magnet temperature TR2 of the rear motor 12 estimated at S10 based on the driving force distribution information D specified at S20. Specifically, the motor ECU 20 multiplies the magnet temperature TR2 by the driving force distribution information D to calculate the magnet temperature TF2.

In S30, the motor ECU 20 monitors whether a predetermined time (for example, 1 sec) has elapsed after S22 is completed. If the predetermined time has elapsed, the motor ECU 20 determines YES in S30 and returns to S10. That is, the motor ECU 20 executes S10 to S22 each time a predetermined time elapses.

Figure 3:
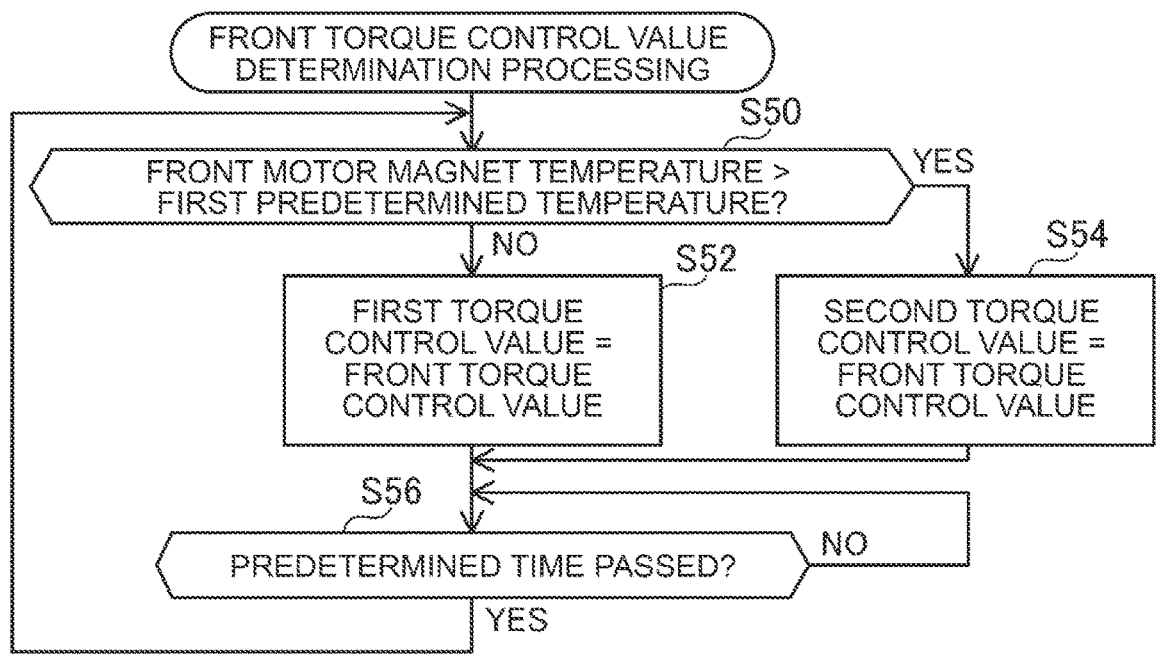
FIG. 3 is a flowchart of front torque limit value determination processing.

Front Torque Limit Value Determination Process; FIG. 3

Front torque limit value determination processing for determining the front torque limit value will be described with reference to FIG. 3.

At S50, the motor ECU 20 determines whether or not the magnet temperature TF2 of the front motor 10 estimated at S22 in FIG. 2 is higher than the first predetermined temperature. Motor ECU 20 executes S52 when magnet temperature TF2 is equal to or lower than the first predetermined temperature (NO in S50). Motor ECU 20 executes S54 when magnet temperature TF2 is higher than the first predetermined temperature (YES in S50).

In S52, the motor ECU 20 determines the first torque limit value as the front torque limit value. After completing S52, the motor ECU 20 executes S56.

In S54, the motor ECU 20 determines a second torque limit value smaller than the first torque limit value as the front torque limit value. After completing S54, the motor ECU 20 executes S56. S56 is the same as S30 in FIG. 2. That is, the motor ECU 20 executes the processing from S50 to S54 each time the predetermined time elapses. With such a configuration, the front torque limit value can be reduced when the magnet temperature TF2 of the front motor 10 is relatively high. That is, the motor load of the front motor 10 can be limited. Therefore, the magnet temperature TF2 can be suppressed from becoming high, and the durability of the front motor 10 can be improved.

Figure 4:
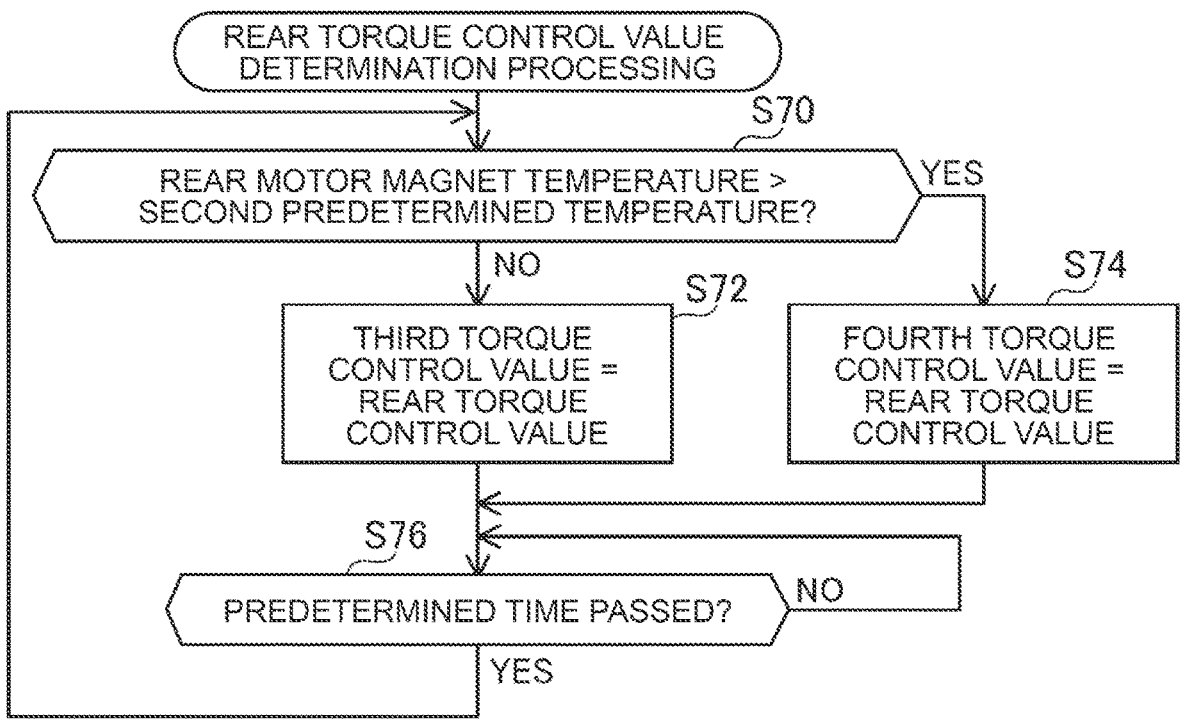
FIG. 4 is a flowchart of rear torque limit value determination processing.

Rear Torque Limit Value Determination Process; FIG. 4

A rear torque limit value determination process for determining the rear torque limit value will be described with reference to FIG. 4.

At S70, the motor ECU 20 determines whether or not the magnet temperature TR2 of the rear motor 12 estimated at S12 of FIG. 2 is higher than the second predetermined temperature. Motor ECU 20 executes S72 when magnet temperature TR2 is equal to or lower than the second predetermined temperature (NO in S70). Motor ECU 20 executes S74 when magnet temperature TR2 is higher than the second predetermined temperature (YES in S70). The second predetermined temperature may be the same as or different from the first predetermined temperature.

At S72, the motor ECU 20 determines the third torque limit value as the rear torque limit value. After completing S72, the motor ECU 20 proceeds to S76.

In S74, the motor ECU 20 determines a fourth torque limit value smaller than the third torque limit value as the rear torque limit value. After completing S74, the motor ECU 20 executes S76. S76 is the same as S30 in FIG. 2. That is, the motor ECU 20 executes the processing from S70 to S74 each time the predetermined time elapses. With such a configuration, the rear torque limit value can be reduced when the magnet temperature TR2 of the rear motor 12 is relatively high. That is, the motor load of the rear motor 12 can be limited. Therefore, the magnet temperature TR2 can be suppressed from becoming high, and the durability of the rear motor 12 can be improved.

As described above, the electrified vehicle 2 includes a rear motor 12 (an example of a "first motor"), a front motor 10 (an example of a "second motor"), a temperature sensor 12c, and a motor ECU 20 (an example of a "control device"). A front motor 10 drives a front wheel 14 (an example of a "second wheel"). A temperature sensor 12c is provided for the rear motor 12. The motor ECU 20 estimates the magnet temperature TR2 of the rear motor 12 based on the detection signal from the temperature sensor 12c. The motor ECU 20 corrects the magnet temperature TR2 based on information indicating the relative relationship between the operation of the rear motor 12 and the operation of the front motor 10. By executing these processes, the motor ECU 20 estimates the magnet temperature TF2 of the front motor 10, controls the operation of the rear motor 12 based on the magnet temperature TR2, and controls the operation of the front motor 10 based on the magnet temperature TF2.

According to the above configuration, the motor ECU 20 can control the operation of the rear motor 12 based on the magnet temperature TR2 estimated based on the detection signal from the temperature sensor 12c. Furthermore, the motor ECU 20 can control the operation of the front motor 10 based on the magnet temperature TF2 estimated using the magnet temperature TR2. Therefore, the electrified vehicle 2 does not need to have a temperature sensor provided for the front motor 10 to estimate the magnet temperature TF2. Therefore, the parts constituting the electrified vehicle 2 can be reduced.

The information indicating the relative relationship is driving force distribution information D that indicates the proportion of the requested driving force for the front wheels of the front motor 10 to the requested driving force for the rear wheels of the rear motor 12. There is a correlative relation between the requested driving force and the magnet temperature. Therefore, by correcting the magnet temperature TR2 based on the information indicating the proportion of the requested front wheel driving force of the front motor 10 to the requested rear wheel driving force of the rear motor 12, the magnet temperature TF2 can be appropriately estimated.

Second Embodiment

The electrified vehicle 2 of this embodiment differs from the electrified vehicle 2 of the first embodiment in the details of the processes executed in S20 and S22 of FIG. 2.

In S20 of FIG. 2, the motor ECU 20 acquires the front motor revolutions and the rear motor revolutions.

In S22, the motor ECU 20 estimates the magnet temperature TF2 of the front motor 10 using the magnet temperature TR2 of the rear motor 12, the front motor revolutions, and the rear motor revolutions. Magnet temperature TR2 is estimated in S10. The front motor revolutions are obtained in S20. The rear motor revolutions are obtained in S20. The motor ECU 20 calculates information indicating the proportion of the front motor revolutions to the rear motor revolutions. The motor ECU 20 estimates the magnet temperature TF2 by correcting the magnet temperature TR2 based on the information. Specifically, the magnet temperature TF2 is calculated by multiplying the magnet temperature TR2 by the information.

As described above, in this embodiment, the information indicating the relative relationship is information indicating the proportion of the front motor revolutions of the front motor 10 to the rear motor revolutions of the rear motor 12. There is a correlative relation between the motor revolutions and the magnet temperature. Therefore, by correcting the magnet temperature TR2 based on the information indicating the proportion of the front motor revolutions to the rear motor revolutions, the magnet temperature TF2 can be properly estimated.

Third Embodiment

The electrified vehicle 2 of this embodiment differs from the electrified vehicle 2 of the first embodiment in the details of the processes executed in S20 and S22 of FIG. 2.

In S20 of FIG. 3, the motor ECU 20 identifies the motor load of the rear motor 12 (hereinafter "rear motor load") and the motor load of the front motor 10 (hereinafter "front motor load"). The motor ECU 20, for example, identifies the rear motor load based on the output current of the front inverter, and identifies the rear motor load based on the output current of the rear inverter.

In S22, the motor ECU 20 estimates the magnet temperature TF2 of the front motor 10 using the magnet temperature TR2 of the rear motor 12, the front motor load, and the rear motor load. Magnet temperature TR2 is estimated in S10. The front motor load is identified at S20. The rear motor load is identified at S20. The motor ECU 20 calculates information indicating the proportion of the front motor load to the rear motor load. The motor ECU 20 corrects the magnet temperature TR2 based on this information. Through these processes, the motor ECU 20 estimates the magnet temperature TF2. Specifically, the magnet temperature TF2 is calculated by multiplying the magnet temperature TR2 by the information.

As described above, in this embodiment, the information indicating the relative relationship is information indicating the proportion of the motor load of the front motor 10 to the rear motor load of the rear motor 12. There is a correlative relation between motor load and magnet temperature. Therefore, by correcting the magnet temperature TR2 based on the information indicating the proportion of the front motor load to the rear motor load, the magnet temperature TF2 can be properly estimated.

Although the specific examples disclosed by the present disclosure have been described in detail above, these are merely examples and do not limit the scope of claims. The techniques described in the claims include various modifications and alterations of the specific examples illustrated above.

First Modification

In S20 of FIG. 2, the motor ECU 20 may identify the history of the rear wheel requested driving force and the history of the front wheel requested driving force for a predetermined period (for example, 5 seconds). In S22, the motor ECU 20 may calculate the magnet temperature TF2 using the history of the rear wheel requested driving force and the history of the front wheel requested driving force. A similar configuration can also be applied to the second and third embodiments. In another modification, the motor ECU 20 may specify the average value of the rear wheel requested driving force and the average value of the front wheel requested driving force in a predetermined period in S20. In S22, the motor ECU 20 may calculate the magnet temperature TF2 using the average value of the rear wheel requested driving force and the average value of the front wheel requested driving force. A similar configuration can also be applied to the second and third embodiments.

Second Modification

The motor ECU 20 may acquire information on two or more examples among the first to third examples in S20 of FIG. 2. In S22, the motor ECU 20 may calculate the magnet temperature TF2 using information obtained from two or more examples among the first to third examples.

Third Modification

The front motor 10 may be provided with a temperature sensor, and the rear motor 12 may not be provided with a temperature sensor. If the electrified vehicle 2 includes a left front wheel motor that drives the left front wheel and a right front wheel motor that drives the right front wheel, only one of the left front wheel motor and the right front wheel motor may be provided with a temperature sensor.

Fourth Modification

The temperature sensor 12c may be a sensor that detects the magnet temperature TF2 of the rear motor 12, the temperature near the rear motor 12, and the temperature of the oil flowing through the reduction gear corresponding to the rear motor 12.

In addition, the technical elements described in this specification or in the drawings exhibit technical usefulness alone or in various combinations, and are not limited to the combinations described in the claims at the time of filing. In addition, the techniques illustrated in the present specification or drawings can achieve a plurality of objectives at the same time, and achieving one of the objectives itself has technical usefulness.

What is claimed is:

1. An electrified vehicle, comprising:
   a first motor that drives a first wheel;
   a second motor that drives a second wheel that is different from the first wheel;
   a temperature sensor provided for the first motor; and
   a control device, wherein the control device
   estimates a temperature of the first motor based on a detection signal from the temperature sensor,
   estimates a temperature of the second motor by correcting the temperature of the first motor based on information indicating a relative relation between operation of the first motor and operation of the second motor,
   controls the operation of the first motor based on the temperature of the first motor that is estimated, and
   controls the operation of the second motor based on the temperature of the second motor that is estimated.

2. The electrified vehicle according to claim 1, wherein the information indicating the relative relation is information indicating a proportion of requested driving force of the second motor as to requested driving force of the first motor.

3. The electrified vehicle according to claim 1, wherein the information indicating the relative relation is information indicating a proportion of revolutions of the second motor as to revolutions of the first motor.

4. The electrified vehicle according to claim 1, wherein the information indicating the relative relation is information indicating a proportion of a motor load of the second motor as to a motor load of the first motor.

* * * * *